(No Model.)

H. W. LIBBEY.
ELECTRIC BICYCLE.

No. 596,274. Patented Dec. 28, 1897.

Witnesses.
Winifred G. Kerwin.
Edward G. Brown

Inventor.
Hosea W. Libbey
by Edwin Brown.
attorney.

UNITED STATES PATENT OFFICE.

HOSEA W. LIBBEY, OF BOSTON, MASSACHUSETTS.

ELECTRIC BICYCLE.

SPECIFICATION forming part of Letters Patent No. 596,274, dated December 28, 1897.

Application filed December 14, 1895. Serial No. 572,208. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Bicycles, of which the following, taken in connection with the accompanying drawings, is a specification.

My invention relates to certain improvements in electric bicycles; and the invention consists in imparting motion to the rear wheel from a motor or motors arranged vertically over said wheel by means of sprocket-wheels and chain, said motor being supplied with electric energy from a battery supported in the loop of the frame between the wheels.

Figure 1:
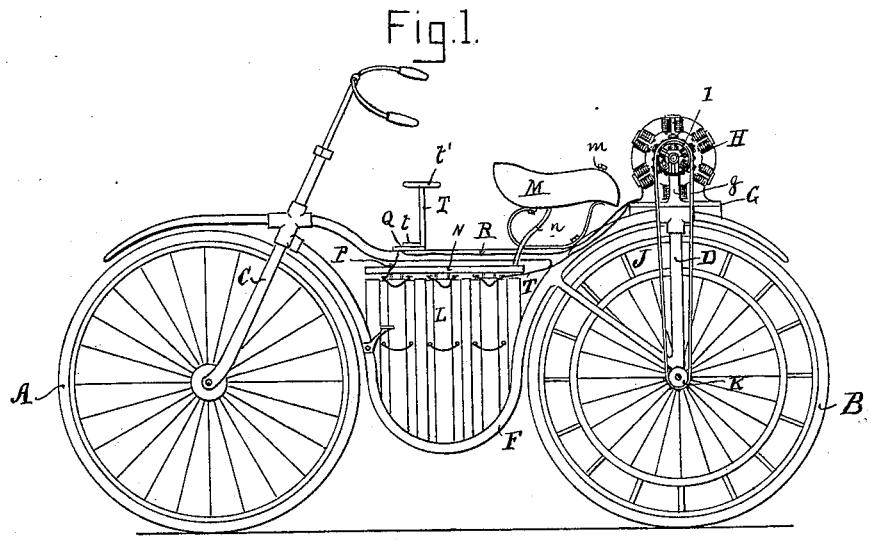
Figure 2:
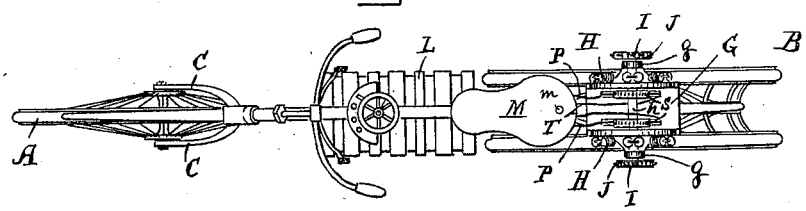
Figure 3:
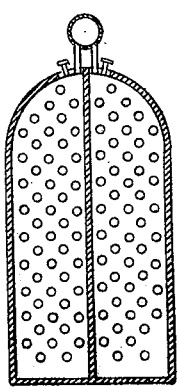

Referring to the accompanying drawings, Figure 1 represents a side view of an electric bicycle embodying my invention. Fig. 2 is a plan or top view of same, and Fig. 3 is a vertical transverse section of the battery.

A represents the front or steering wheel, and B the rear or driving wheel, having a double tire, so that the wheel will be maintained in a vertical position, having three points of rest. I prefer to employ a wheel constructed according to a patent granted to me and dated January 24, 1893, No. 490,391.

The front or steering wheel A is mounted in a fork C of ordinary construction, and the rear double wheel B is mounted in a vertical fork D, said forks being connected together by a suitable frame F.

On the frame F, over the center of the rear or driving wheel B, is secured a plate G, having standards $g$, that carry the shaft $h$ of electric motors H, which shaft is fitted at each end with a sprocket-wheel I, over which passes an endless chain J, that also passes over a sprocket-wheel K on the end of the axle of the driving-wheel B, which is firmly secured to the axle, said axle being carried by bearings on the end of the fork D. Thus motion is transmitted to both sides of said driving-wheel B; but, if desired, only one motor and sprocket-gears might be employed, but I prefer to employ two, so that should, from any cause, one of the motors H, wheels I K, or chain J, become injured, so as to render them unfit for use, then the machine can be driven by those on the side that have not been injured.

In the loop of the frame F is secured an electric battery L, which may be of any desired construction, but I prefer to have it of the construction shown and described in a patent granted to me the 29th day of August, 1893, No. 504,130; but in this case the battery would be divided by a central partition, as shown in Fig. 3, thus forming it into two batteries. In order to have a continuous supply of exciting fluid to said batteries, I employ a hollow-seat reservoir or tank M, fitted with a nozzle $m$, through which nozzle the tank can be filled. The said tank is connected by a flexible tube $n$ to a pipe N, arranged over the batteries, which by small tubes communicate with the cells of said batteries, so that they are kept filled with exciting fluid.

Although I have shown and described a primary battery, if desired a storage battery might be employed.

The negative wires P of the batteries are connected to an electric controller Q, from which wires R run to one of the brushes of commutators S, and the positive wires T run to the brushes on the other side of the commutators, the circuit being made and broken by the electric controller Q, that is operated by an upright shaft T, fitted at its lower end with an arm $t$ to make and break the current, and at its upper end with a wheel $t'$ in front of the seat M to operate same.

The motors may be of any desired construction, but so arranged as to operate a common shaft $h$, upon the ends of which are mounted the sprocket-wheels I, which by chains J impart motion to sprocket-wheels K, secured to the driving-wheels.

What I claim is—

1. In a bicycle, the combination, with a frame provided with a vertical rear fork, of a double motor upon the fork, means for communicating motion from either one or both of the motors to the driving-wheel, a double electrical battery upon the frame, and means for communicating energy from either of the motors to the driving-wheel of the bicycle in a line with the rear fork, substantially as set forth.

2. In a bicycle, the combination, with a frame provided with a vertical rear fork, of a plate upon the top of the fork, provided with vertical standards, a double motor in said standards each end of the shaft of which is provided with a sprocket-wheel, a chain from each of the wheels to the driving-wheel, a double electrical battery upon the frame, and means for communicating energy from the battery to the motor, substantially as set forth.

3. In a bicycle, the combination, with a frame, provided with a vertical rear fork, of a plate upon the fork provided with vertical standards, a shaft journaled in said standards, each end of which is provided with a sprocket-wheel, a sprocket-chain from each end of the shaft to the driving-wheel, a double battery upon the frame, and means for communicating energy from the battery to the shaft, substantially as set forth.

In testimony whereof I have signed my name to this specification, in the presence of two subscribing witnesses, on this 30th day of November, A. D. 1895.

HOSEA W. LIBBEY.

Witnesses:
   CHAS. STEERE,
   EDWIN PLANTA.